(12) United States Patent
Lohmar et al.

(10) Patent No.: US 8,386,900 B2
(45) Date of Patent: Feb. 26, 2013

(54) CONTROLLING POINT-TO-MULTIPOINT TRANSMISSIONS OF CONTENT DATA OVER A RADIO INTERFACE

(75) Inventors: Thorsten Lohmar, Aachen (DE); Hans Bertil Rönneke, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 289 days.

(21) Appl. No.: 12/867,292

(22) PCT Filed: Feb. 12, 2008

(86) PCT No.: PCT/EP2008/001069
§ 371 (c)(1),
(2), (4) Date: Aug. 12, 2010

(87) PCT Pub. No.: WO2009/100730
PCT Pub. Date: Aug. 20, 2009

(65) Prior Publication Data
US 2010/0325515 A1 Dec. 23, 2010

(51) Int. Cl.
*G06F 11/00* (2006.01)
(52) U.S. Cl. .................................. 714/799; 714/758
(58) Field of Classification Search .................. 714/758, 714/799
See application file for complete search history.

(56) References Cited

U.S. PATENT DOCUMENTS

| | | | | |
|---|---|---|---|---|
| 5,844,918 | A * | 12/1998 | Kato | 714/751 |
| 2002/0001302 | A1 * | 1/2002 | Pickett | 370/352 |
| 2005/0080850 | A1 * | 4/2005 | Salesky et al. | 709/204 |
| 2005/0144009 | A1 * | 6/2005 | Rodriguez et al. | 704/275 |
| 2008/0008167 | A1 * | 1/2008 | Ver Steeg | 370/389 |

FOREIGN PATENT DOCUMENTS

WO   WO 2008/006011 A   1/2008

OTHER PUBLICATIONS

Sanjoy Paul et al: "Rellable Multicast Transport Protocol (RMTP)" IEEE Journal on Selected Areas in Communications, IEEE Service Center, PISCATAWAY, US, vol. 15, No. 3, Apr. 1, 1997, XP011054624.

Min Jeong Lee et al: "Performance improvements of wireless IP multicast conference system based on designated receivers" Communications, 1998. ICC 98. Conference Record. 1998 IEEE International Conference on Atlanta, GA, USA Jun. 7-11, 1998, New York: NY, USA,IEEE, US, vol. 2, Jun. 7, 1998, pp. 807-811, XP010284688.

* cited by examiner

*Primary Examiner* — M. Mujtaba K Chaudry
(74) *Attorney, Agent, or Firm* — Roger S. Burleigh

(57) ABSTRACT

The invention relates to error control for point-to-multipoint (PTM) transmissions of content data over a radio interface. A method embodiment for controlling a PTM transmission in a PTM-enabled network comprises the steps of receiving and storing redundancy data at a dedicated redundancy data storage in a radio access network, wherein the redundancy data are provided for a correction of transmission errors in the content data resulting from the transmission of the content data without the redundancy data over one or more radio interfaces; receiving a request for redundancy data from a redundancy data control node; and responding to the redundancy data request by providing at least a portion of the redundancy data.

8 Claims, 9 Drawing Sheets

CONTROLLING POINT-TO-MULTIPOINT TRANSMISSIONS OF CONTENT DATA OVER A RADIO INTERFACE

TECHNICAL FIELD

The invention relates to point-to-multipoint (PTM) transmission techniques, e.g. broadcast/multicast transmissions in mobile networks. In particular, the invention relates to techniques for controlling a PTM transmission of content data in a PTM-enabled network over a radio interface.

BACKGROUND

PTM transmissions such as multicast or broadcast transmissions are used for distributing data from typically a single source to a plurality of receivers. In a typical scenario, some content in the form of multimedia data is distributed to an audience within the framework of a (mobile) TV service, Newsfeed, Podcast service, etc. The users may or may not have to register for the service. The content data may be provided in the form of one or more media files representing audio data, video data, image data, but may also contain other data such as any type of binary data such as compressed data files, software files including some piece of software for execution on a processing host, etc. On the other hand, also a simple text file which is distributed by, e.g., a Newsfeed service adapted to bandwidth-limited conditions in a mobile network may be regarded as content.

The content data distributed via a PTM transmission needs to be free from transmission errors to a very high degree. For example, in resource-limited transmission environments such as mobile networks large content files such as image or video files are compressed before transmission using a suitable compression algorithm, e.g. MPEG-2, MPEG-4, MP3, GZIP, etc. The corresponding decompression in the receiving device will in general not be able to handle with transmission errors due to the complex interrelations of multiple data sets (e.g., neighbouring frames in a video) induced by the compression algorithm. Even a single 1-bit error may result in the situation that the received file cannot be opened for presentation to the user. Un-compressed files are also vulnerable to transmission errors; consider for example a multimedia file whose header information is corrupted: Also this file will most probably not open.

In order to reduce transmission errors in data transmission environments, some form of error control is required. Error control enables a data receiver to perform error detection and possibly also error correction in case of transmission errors. Techniques for error control are of general importance in many data transmission environment. Some environments are more prone to errors than others; for example a wireline transmission will generally produce less errors per given amount of data than a wireless transmission. Error control schemes are available which have proven particularly useful in the one or the other environment in order to achieve the desired degree of error-free transmission.

As an example for mobile network environments, the UMTS (Universal Mobile Telecommunications Service) MBMS (Multimedia Broadcast/Multicast Service) in 3GPP Release 6 requires that a conforming mobile network implements two mechanisms for increasing the transmission reliability: the first mechanism comprises to add FEC (Forward Error Control) data to the transmitted MBMS content data; the second mechanism is a post-delivery file repair procedure.

Regarding the first mechanism, the FEC data represent redundant information which is provided together with the content data in order to enable the receiver to reconstruct the content data in case of an transmission error. For example, 5 content data bits may be transmitted together with 3 redundancy bits, wherein the redundancy bits (the redundancy data) has been calculated from the 5 content data bits according to a predetermined FEC algorithm. The receiver applies a corresponding algorithm to detect errors in the 5 data bits and to possibly correct the error or request re-transmission, depending on the specific procedure.

Within the framework of the MBMS file repair procedure, a receiving device detects a transmission error, for example because a received filed cannot be decompressed or the header of the file appears to be corrupted (or some bit errors are detected because the content data comprises some redundancy data for detection, but not correction, of transmission errors). The receiving device may then request a re-transmission of the corresponding file. This includes that the device sends a file repair request to the originator of the content data controlling the PTM content transmission in the network. This entity is called BM-SC (Broadcast/Multicast Service Centre) in the MBMS field. The BM-SC may use a PTP (point-to-point) connection for re-transmission of the requested file to the receiving device. In case too many receiving devices request a re-transmission of the file, the BM-SC may also decide to use an MBMS bearer for re-transmission, i.e. performs another broadcast or multicast content data transmission.

Adding redundancy data (FEC data) to the content data is problematic, as it increases the transmission resources required over the radio interface to a considerable degree. Still then, the amount of redundancy provided may be insufficient for successful error correction in case a receiver is in a location with difficult transmission conditions. On the other hand, the added redundancy data may be superfluous for receiving devices in more favourable transmission conditions, in which case the added redundancy data wastes transmission resources.

Requesting a re-transmission of data blocks or even entire files of content data requires the setup of typically many extra PTP connections or even another PTM transmission. This leads to a considerable amount of signaling in the network, usage of processing resource in the control node of the content data transmission (e.g., BM-SC) and further involved nodes in the network. Further, a re-transmission poses a considerable delay in error recovery, which is made worse in case of the MBMS file repair procedure by a mandatory back-off time after the end of the PTM content data transmission in order to avoid network congestion from an implosion of too many parallel file repair requests.

SUMMARY

There is a demand for an error control mechanism for content data PTM transmissions which enables a reliable transmission over a radio interface of a PTM-enabled network while making efficient use of transmission resources.

This demand is satisfied by a first method for controlling a point-to-multipoint "PTM" transmission of content data in a PTM-enabled network. The method comprises the steps of receiving redundancy data at a dedicated redundancy data storage in a radio access network of the PTM-enabled network over which the PTM transmission of the content data is performed, wherein the redundancy data are provided for a correction of transmission errors in the content data resulting from the transmission of the content data without the redundancy data over one or more radio interfaces of the radio access network; storing the received redundancy data in the redundancy data storage; receiving a request for redundancy data from a redundancy data control node; and responding to the redundancy data request by providing at least a portion of the redundancy data.

The PTM-enabled network may for example be a mobile network (e.g., UMTS or LTE network), wireless network, or any other network comprising a radio interface. The content data may be any kind of multimedia data including speech or audio data, image and video data, text data, but also software code for execution on a receiving host and any kind of compressed data. An example for a PTM content transmission is an MBMS broadcast or multicast transmission. The redundancy data may be FEC data or any other kind of redundant information allowing to correct transmission errors occurring in the content data, e.g. packet loss in a radio link over the radio interface. For example, the redundancy data may comprise FEC data which enables a correction of packet losses. The redundancy data may additionally or alternatively comprise portions of the content data itself. While the content data may also comprise some redundant information, the redundancy data stored in the redundancy data storage may comprise the same and/or other FEC data.

The redundancy data storage is dedicated to storing redundancy data, i.e. does not store the content data. The content data is distributed entirely via different nodes and will neither reach nor leave the redundancy data storage. The redundancy data storage is provided as a part of the radio access network for one or more radio interfaces, i.e. cells, served by the radio access network. The redundancy data storage may be associated with a particular transceiving station or stations of the PTM-enabled network providing the radio interface. For example, the redundancy data storage may be associated with one or more Node-Bs or RNCs in an UMTS network or evolved Node-B in an LTE (Long Term Evolution) network. In one implementation, the redundancy data storage is associated with an RNC (Radio Network Controller) controlling multiple Node-Bs in an UTRAN (UMTS Radio Access Network). The redundancy data storage may, e.g., be implemented on a common hardware platform with the RNC.

The redundancy data may be received via a PTP or PTM transmission separate from the PTM transmission of the content data. In one variant in a UMTS network, a BM-SC controls an MBMS content distribution towards a plurality of recipients and a parallel distribution of FEC data via a PTM transmission (or via multiple PTP connections) towards multiple redundancy data storages in one or more radio access networks of the UMTS network. In case of a PTM transmission, the method may comprise the initial steps of receiving an indication of the upcoming PTM transmission of the redundancy data provision, and joining, in response to the received indication, a PTM group by which the PTM transmission of the redundancy data is performed.

In one implementation of the method, the step of responding to the redundancy data request is performed only after a termination of the PTM transmission of the content data. This may be assured in different ways. For example, an indication of the termination may be received, which may, e.g. be provided by a control node of the PTM transmission or a control node controlling the associated radio interface. In other variants, the originator of the redundancy data request, e.g. a receiving device or a control node of the associated radio interface may be configured to send the request only after the termination of the PTM transmission. The redundancy data storage may be adapted to discard any redundancy data request received prior to the an explicit indication of the termination of the PTM content data transmission.

The step of receiving the redundancy data may comprise receiving at least one of a storage time value indicating a time span for storing the redundancy data in the redundancy data storage and a duration time value indicating a duration of the reception of the redundancy data. One or both of the time values may be received beforehand or in parallel to the (beginning of the) redundancy data transmission. In response to receiving the storage time value, a corresponding timer may be started in the redundancy data storage which after expiry triggers removal of the redundancy data from the storage. The duration time value may be used in the redundancy data storage for controlling the reception of the redundancy data, e.g. provision of buffer spaces, etc.

The above-mentioned demand is further satisfied by a method for controlling a PTM transmission of content data in a PTM-enabled network, which is performed in a redundancy data control node in a radio access network of the PTM-enabled network. The method comprises the steps of receiving at least one error indication indicating a content data transmission error from one or more receiving devices accessing the PTM-enabled network via one or more radio interfaces; and providing, based on the reception of the content error indication, a request for redundancy data to a redundancy data storage in a radio access network providing the one or more radio interfaces.

The redundancy data control node may be adapted to perform a decision, based on the (possibly many) received content error indication(s), on, e.g., whether or not the redundancy data request is to be sent to the redundancy data storage, which redundancy data are to be requested, to which of several redundancy data storages to send a request, etc. In one variant, the redundancy data control node may also decide on whether or not to forward the redundancy data over the one or more radio interfaces as (multiple) PTP transmission(s) or one or more PTM transmissions, e.g. based on the determination that the number of receiving devices with transmission errors exceeds a threshold value.

The redundancy data control node may be a stand-alone device or may be collocated with other nodes. For example, the functionality of the redundancy data control node may be implemented on a radio interface control node such as a radio base station, e.g., an RNC or Node-B in a radio access network (RAN) in an UMTS network or any other node adapted for controlling a radio or wireless interface for data transmission, such as an Um- or Uu-interface in GSM or UMTS networks, respectively. The task of controlling the radio interface may be distributed between several nodes in a radio access network, for example may be distributed between an RNC and a Node-B. The redundancy data storage may be associated with any of the radio interface control nodes involved in controlling the radio interface. Therefore the redundancy data control node and the redundancy data storage may be arranged near to each other, e.g. at the same site or hardware platform, or may be arranged remotely from each other. For example, in a radio access network of an UMTS network, each RNC may have an associated redundancy data storage.

In case the redundancy data storage is implemented on a radio interface control node, the method may comprise the initial step of controlling the one or more radio interfaces to perform the PTM transmission of the content data over the one or more radio interfaces. The radio interface control node may also concerned with the PTM content transmission; in this case, the method may further comprise the steps of receiving the content data; determining the redundancy data from the received content data; forwarding the content data over the one or more radio interfaces; and providing the redundancy data to the redundancy data storage. Thus, in an UMTS network, part or all of the redundancy data may not be determined by the BM-SC, but locally by the Node-Bs or RNCs. In one scenario, the receiving devices may be mobile terminals in an UMTS network, which request (additional) redundancy data not from a BM-SC, but from the serving radio interface control node, e.g. a Node-B or RNC. The step of determining the redundancy data may comprise calculating redundancy data from the content data, e.g. applying a FEC algorithm such as the MBMS FEC algorithm as described in 3GPP TS 26.346

The step of providing the redundancy data request may be performed only after a termination of the PTM transmission of the content data. One implementation of the method comprises the step of receiving a termination indication of the termination of the PTM transmission, e.g., a Session Stop within an MBMS framework. The step of providing the redundancy data request to the redundancy data storage is then performed only after the termination indication has been received. Error indications received before the termination indication may be discarded.

Some implementations of the method may comprise the further steps of receiving a response to the redundancy data request from the redundancy data storage, the response comprising redundancy data for a correction of transmission errors in the content data resulting from the transmission of the content data without the redundancy data over the one or more radio interfaces; and forwarding the received redundancy data over the one or more radio interfaces. In other implementations, the redundancy data storage may provide the redundancy data directly to the requesting mobile terminals, i.e. via (different) radio interface control nodes.

The redundancy data may be forwarded over the radio interface as a PTM transmission. For example, the redundancy data control node may decide to initiate a broadcast or multicast transmission in case a number of received error indications exceeds a predetermined threshold value.

Different redundancy data may be determined in different parts of the radio access network. For example, a radio interface control node serving a cell with error-prone transmission conditions may be configured, e.g. by network administration, to determine more extensive redundancy data than a radio interface control node serving a cell with less error-prone transmission conditions.

The above-mentioned demand is still further satisfied by a method for controlling a PTM transmission of content data in a PTM-enabled network performed in a PTM transmission control node of the PTM-enabled network. The method comprises the steps of determining redundancy data from the content data, wherein the redundancy data are provided for a correction of transmission errors in the content data resulting from the transmission of the content data without the redundancy data over a radio interface of the PTM-enabled network; transmitting the content data in an application layer extending over the radio interface to one or more receiving devices; and transmitting the determined redundancy data to a redundancy data storage associated with the radio interface.

The PTM transmission control node may, for example, be a BM-SC, MBMS-Gateway or MBMS control entity (MCE) in a core network of a PTM-enabled UMTS network. The step of determining the redundancy data may comprise calculating the redundancy data from the content data using predetermined FEC algorithms. This step may be performed a longer time-span before, immediately before or even in parallel with the transmission steps. The redundancy data may be transmitted after the content data, simultaneously with the content data, or may even be transmitted before the content data.

According to some variants of this method, the redundancy data are transmitted with a PTM transmission separate from the PTM transmission for the content data. For example, a different MBMS bearer may be used in an UMTS network for the transmission of the redundancy data and the transmission of the content data.

The step of transmitting the redundancy data may comprise transmitting at least one of a storage time value indicating a time span for storing the redundancy data in a redundancy data storage and a duration time value indicating a duration of the transmission of the redundancy data.

The above-mentioned demand is also satisfied by a method for receiving a PTM transmission of content data from a PTM-enabled network performed in a receiving device connected to the PTM-enabled network via a radio link. The method comprises the steps of receiving the content data over an application layer connecting the receiving device and a PTM transmission control node transmitting the content data; detecting a transmission error in the received content data; transmitting an error indication over a radio link indicating the detected transmission error to a radio access network of the PTM-enabled network, wherein the radio link connects the receiving device and the radio access network of the PTM-enabled network for transmitting the content data in a radio link layer; receiving, in response to the error indication, redundancy data over the radio link from the radio access network; and correcting the transmission error in the content data using the received redundancy data.

The receiving device may be an item of User Equipment (UE) in an UMTS network or any other terminal device, host device, etc. adapted for connection via a radio interface to a data transmission network. The radio interface may be a radio interface in a mobile network or any other wireless interface for connecting to a data transmission network. The radio interface may comprise a radio link layer which may, e.g., be the RLC (Radio Link Control) layer over the Uu radio interface in an UMTS network or in general any data link layer providing data recovery mechanisms for data links (physical layer) over a radio interface. The radio link may connect the receiving device and a Node-B in the UMTS network according to the radio link layer.

The application layer may comprise any end-to-end connection between the receiving device and the PTM transmission control node, e.g. a BM-SC. In one implementation, the end-to-end connection in the application layer for transmitting the content data may be based on a PTM (broadcast, multicast) bearer such as an MBMS bearer in an UMTS network, which may, e.g., be based on IP multicast. The detection of the transmission error may comprise the detection of one or more corrupted or missing packets in the radio link layer (or any other layer). An error detection may be based on redundant information included in the received content data. For example, the content data may include a small amount of FEC data which allows detection of errors. The transmission error detection may additionally or alternatively comprise file corruption detection mechanisms, hash value comparison mechanisms, or any other suitable detection technique operative in the radio link layer.

In any of the above-described methods, the redundancy data and the content data may be transmitted in separate connections over an application layer in the PTM-enabled network. For example, separate IP multicast groups may be employed. While the content data is distributed towards the receiving devices behind a radio interface (from the point of view of a core network of the PTM-enabled network, from where the content distribution originates), the redundancy data is distributed to the redundancy data storage located before the radio interface.

Further, the abovementioned demand is satisfied by a computer program product, which comprises program code portions for performing the steps of any one of the methods and method aspects described herein when the computer program product is executed on one or more computing devices, for example a redundancy data storage, a radio interface control node, a PTM transmission control node, or a receiving device. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

The abovementioned demand is further satisfied by a redundancy data storage in a radio access network of a network enabled for a PTM transmission of content data. The redundancy data storage is dedicated to storing redundancy data, i.e., it does not store the content data. The redundancy data storage comprises a first component adapted to receive redundancy data provided for a correction of transmission errors in content data resulting from the transmission of the content data without the redundancy data over one or more radio interfaces of the radio access network; a second component adapted to store the received redundancy data in the redundancy data storage; a third component adapted to receive a redundancy data request from a redundancy data control node; and a fourth component adapted to respond to the redundancy data request by providing at least a portion of the redundancy data.

Still further, the abovementioned demand is satisfied by a redundancy data control node for a radio access network of a network enabled for a PTM transmission of content data. The redundancy data control node comprises a first component adapted to receive at least one error indication indicating a content data transmission error from one or more receiving devices accessing the PTM-enabled network via one or more radio interfaces; and a second component adapted to provide, based on the reception of the content error indication, a request for redundancy data to a redundancy data storage in a radio access network providing the one or more radio interfaces.

The abovementioned demand is moreover satisfied by a PTM transmission control node in a network enabled for a PTM transmission of content data. The PTM transmission control node comprises a first component adapted to determine redundancy data from the content data, wherein the redundancy data are provided for a correction of transmission errors in the content data resulting from the transmission of the content data without the redundancy data over a radio interface of the PTM-enabled network; a second component adapted to transmit the content data in an application layer extending over the radio interface to one or more receiving devices; and a third component adapted to transmit the determined redundancy data to a redundancy data storage associated with the radio interface.

The abovementioned demand is also satisfied by a receiving device connected to a network enabled for a PTM transmission of content data via a radio interface. The receiving device comprises a first component adapted to receive the content data in an application layer connecting the receiving device and a PTM transmission control node transmitting the content data in the application layer; a second component adapted to detect a transmission error in the received content data; a third component adapted to transmit an error indication via the radio link indicating the detected transmission error to a radio access network of the PTM-enabled network, wherein the radio link connects the receiving device and the radio access network of the PTM-enabled network for transmitting the content data in a radio link layer; a fourth component adapted to receive, in response to the error indication, redundancy data via the radio link from the radio access network; and a fifth component adapted to correct the transmission error in the content data using the received redundancy data.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as specific network systems including particular network nodes, communication standards etc., in order to provide a thorough understanding of the current invention. It will be apparent to one skilled in the art that the current invention may be practiced in other embodiments that depart from these specific details. For example, the skilled artisan will appreciate that the current invention may be practised with communication networks different from the UMTS network implementing MBMS services as discussed below to illustrate the present invention. This may include other UMTS variants and other mobile networks, such as GSM networks, or wireless networks, e.g. WLAN or Bluetooth systems. The invention may even be practiced in wireline communication systems, for example in IP-networks. Basically, the invention may be practiced within any PTM-enabled data transmission system in which some kind of error control for data transmissions is applied based on redundant information.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1:
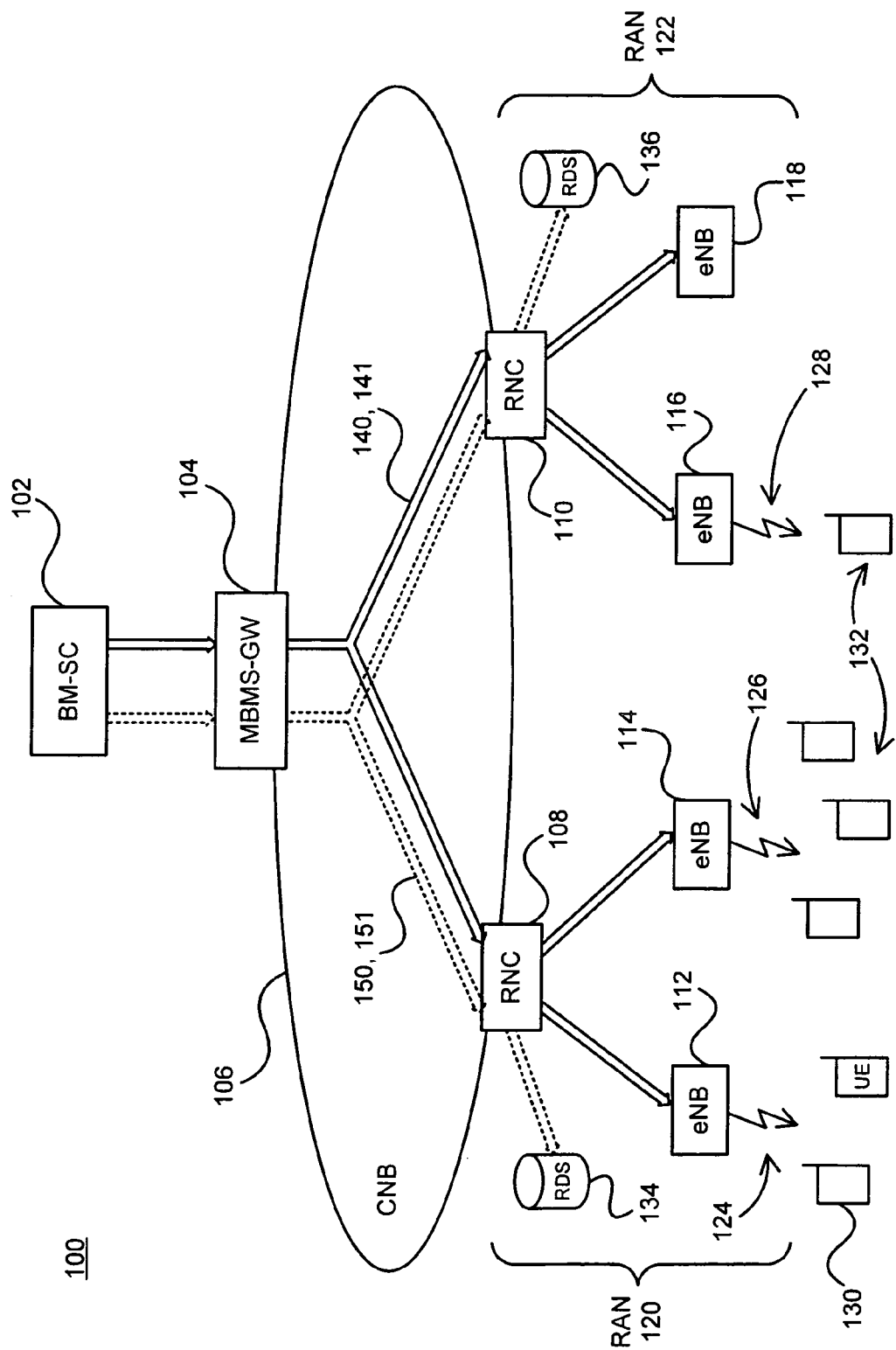
FIG. 1 is a schematic overview of an embodiment of a PTM-enabled network.

FIG. 1 schematically illustrates an UMTS network 100 as an exemplary implementation of a point-to-multipoint (PTM) enabled network. In particular, the UMTS network 100 implements the 3GPP MBMS service feature which is described, e.g., in the 3GPP Technical Specifications TS 23.246, TS 25.346 and TS 26.346. The network 100 comprises a Broadcast/Multicast Service Centre (BM-SC) 102, an MBMS Gateway (GW) 104, a Core Network Backbone (CNB) 106, Radio Network Controllers (RNCs) 108 and 110, each controlling associated of the evolved Node-Bs 112-118. RNC 108 and Node-Bs 112, 114 form a Radio Access Network 120. RNC 110 and Node-Bs 116, 118 form a Radio Access Network 122.

Each of the Node-Bs 112-118 control a radio interface such as radio interfaces 124-128. For example, each of the radio interfaces 124-128 may be an Uu interface. In this way, the Node-Bs serve a number of mobile terminals (UE, User Equipment, according to UMTS terminology) 130, 132, which will be referred to also as "receiving devices" hereinafter.

In each of the RANs 120, 122, a redundancy data storage (RDS) 134 and 136, respectively, is arranged. In particular, RDS 134 is associated with RNC 108 and RDS 136 is associated with the RNC 110. "Associated" may mean that both RNC and RDS are implemented on the same hardware platform, in the same local network, or are otherwise arranged in a way such that the redundancy data stored in the RDS is available to the corresponding RAN via the RNC. In other embodiments, an RDS may also be associated with an Node-B instead of with an RNC.

Solid arrows indicate a PTM transmission 140 of content data 141. Dashed arrows indicate a separate PTM transmission 150 of redundancy data 151. The flow 140 of content data 141 originates from the BM-SC 102 and is directed towards the receiving devices 130, 132. The flow 150 of redundancy data 151 also originates from the BM-SC 102, but is directed towards the redundancy data storages 134 and 136 in the RANs 120 and 122, respectively. Details of the transmissions 140 and 150 in the CNB 106 are omitted. For example, the path of one or both of the transmissions 140 and 150 may proceed along an SGSN, which is however not shown in FIG. 1. Moreover, it is assumed in the following that the PTM transmission 140 is an MBMS transmission. From a generic or service point of view, the MBMS transmission 140 is a one-to-many transmission, namely from the BM-SC 102 to multiple receiving devices 130, 132. Therefore, the transmission 140 is referred to as "PTM" transmission throughout the description, regardless of whether the transmission 140 may be performed, e.g., by a number of PTP connections in the CNB 106 from a transport level point of view. The same holds for the "PTM" transmission 150.

The content data 141 may relate to, for example, a news file including text and images, which is distributed as part of a Newsfeed service to users which have registered therefore. The PTM transmission 140 may thus be an MBMS multicast transmission to the users of the receiving devices 130, 132 (i.e. all devices 130, 132 illustrated in FIG. 1 are assumed to belong to registered users for the sake of clarity). In other words, the receiving devices 130, 132 are members of a multicast group for the particular MBMS-based Newsfeed service.

The content data transmission 140 originating from the BM-SC 102 enters via the MBMS-GW 104 the core network backbone 106 for duplication of the content data 141 and distribution to multiple RNCs such as the RNCs 108 and 110. From each of the RNCs 108, 110, the content data 141 is further duplicated and distributed to those Node-Bs serving cells of the network 100 in which members of the multicast group for the PTM transmission 140 are located. For example, it is exemplarily assumed in FIG. 1 that no device registered for reception of the transmission 140 is located in the cell(s) served by Node-B 118. Thus, the content data 141 is not forwarded to Node-B 118. The Node-Bs 112, 114 and 116 transmit the content data 140 via the radio interfaces 124, 126, and 128 for reception by the receiving devices 130, 132.

The content data 141 may comprise no (or only a minimum amount of) redundancy data. The BM-SC 102 determines redundancy data 151 for the content data 141. While the content data transmission 140 is directed towards the receiving devices 130 and 132, the redundancy data transmission 150 is directed towards the RANs 120 and 122, more precisely the redundancy data storages 134 and 136. Although not shown in FIG. 1, the distribution path of the content data 141 may be very different from the distribution path of the redundancy data 151, e.g. within the core network backbone 106.

The operation and interworking of the various nodes and devices in FIG. 1 will be described in more detail with reference to the FIGS. 2-8. While in FIG. 1 only the process of providing redundancy data to the RANs is illustrated for the sake of clarity, below the process of providing the stored redundancy data to the receiving devices will also be described. In the figures, like reference numerals refer to like components. While the network 100 is described as being an UMTS network, another embodiment may comprise an LTE network. The skilled person will, however, be able to implement any of the mechanisms and components described herein with regard to UMTS terminology analogously in an LTE network.

Figure 2:
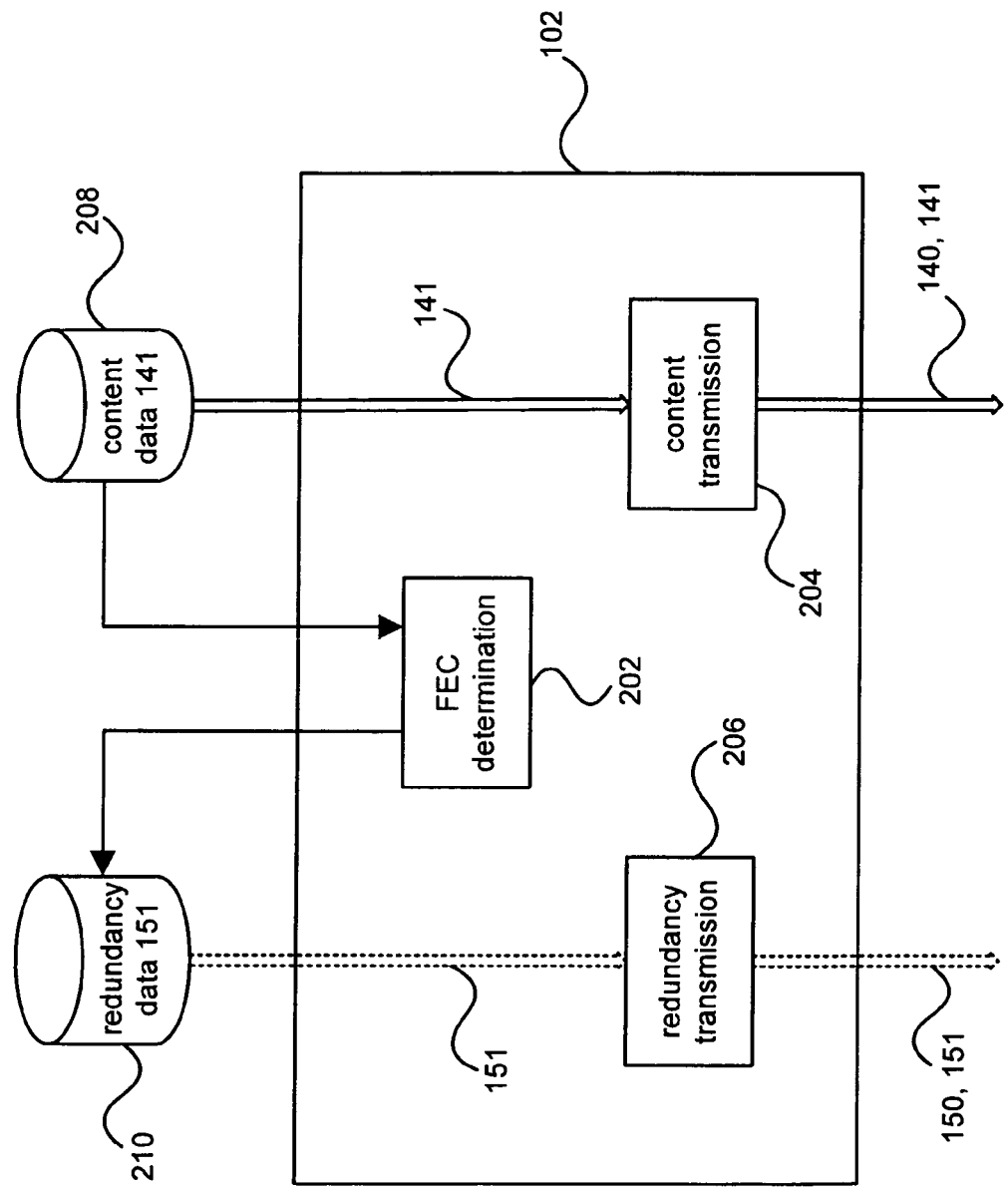
FIG. 2 schematically illustrates functional components of a PTM transmission control node in the PTM-enabled network of FIG. 1.

FIG. 2 schematically illustrates functional components of the BM-SC 102 of FIG. 1. In detail, the BM-SC 102, which is an exemplary implementation of a PTM transmission control node for content data PTM transmissions in a PTM-enabled network, comprises a FEC data determination component 202, a content data transmission component 204, and a redundancy data transmission component 206. A content storage 208 as well as a redundancy data buffer 210 may be associated with the BM-SC 102.

Figure 3:
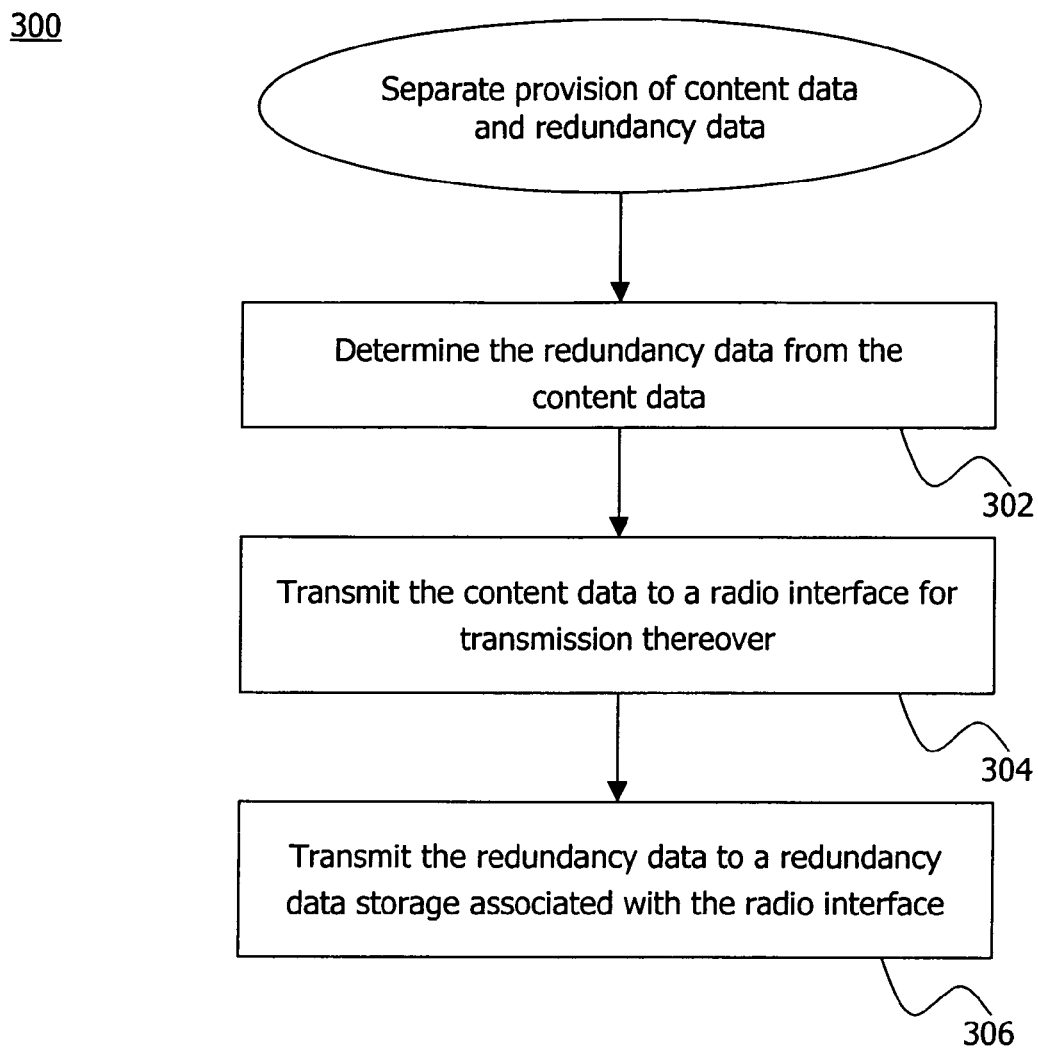
FIG. 3 is a flow diagram exemplarily illustrating an operation of the PTM transmission control node of FIG. 2.

FIG. 3 is a flow diagram illustrating an exemplary sequence 300 of operational steps which may be performed by the BM-SC 102 of FIG. 2. Generally speaking, the BM-SC 102 operates to separately provide content data and redundancy data. Referring to FIGS. 2 and 3, in order to prepare the separate transmissions 140 and 150 of content data 141 and redundancy data 151, in step 302, the determination component 202 determines redundancy data from the content data stored in storage component 208. For example, the determination component 202 may apply a predetermined FEC algorithm such as the MBMS FEC code according to 3GPP TS 26.346. The calculated redundancy data may be buffered in buffer 210.

In step 304, the content data transmission component 204 provides the content data 141 from storage 208 using as an application layer an appropriate MBMS bearer via PTM transmission 140 towards the intended recipients, i.e. the receiving devices 130, 132, via the radio interfaces 124, 126 and 128, as illustrated in FIG. 1. In step 306, the redundancy data transmission component 206 transmits the redundancy data 151 from buffer 210 to the RANs providing the radio interfaces over which the content data 141 is transmitted. More precisely, the component 208 initiates the PTM transmission 150 towards the RDSs 134 and 136 as illustrated in FIG. 1.

The transmissions 140 and 150 may be performed independently of each other. Thus, the redundancy data transmission 150 may be performed before, in parallel to, or after the content data transmission 140. For example, a network resource usage may be used to determine when the redundancy data 151 will be transmitted in relation to the content data 141. As a further alternative, both transmissions 140 and 150 may overlap. For example, both transmission may be started in parallel, but one transmission may finish earlier than the other.

Dependent on the overall transmission conditions in the distribution area of the PTM transmission 140, no redundancy data at all may be included within the content data 141, or some minimum amount of redundancy data may be included therewithin. The redundancy data 151 may comprise—besides redundancy data supplementing the minimum redundancy data (if any) included in the content data 141—also some portions of content data. The BM-SC 102 may be specifically configured to provide a desired amount of redundancy data for the content data 141, or may apply a general decision algorithm based upon, e.g. status information on the transmission conditions at one or more of the radio interfaces 124, 126 and 128 (cf. FIG. 1). The status information may be dynamic, i.e. time-dependent, or may be static, e.g. entered by administrative action.

For example, no FEC data may be included in the content data 141. This may be due to the fact that the general transmission conditions over radio interfaces 124 and 126 are assumed to be good enough such that a trade-off between resource usage over these radio interfaces and transmission reliability does not justify to include redundancy data. The BM-SC 102 may nevertheless calculate FEC data in component 202 and may distribute these redundancy data via the PTM transmission 150 towards the RANs 120 and 122. In a modified embodiment, the BM-SC 102 may provide these redundancy data not to RDS 134, but only to RDS 136 in case the assumed transmission conditions are assumed to be worse at the radio interface 128 as compared to interfaces 124 and 126. In this case, either a PTP connection towards the RDS 136 may be used or a PTM transmission different from the transmission 150.

In one embodiment, the determination component 202 may use a Raptor FEC code to calculate the redundancy data 151. Raptor FEC codes allow to create a large amount of FEC data compared to the content data; see, for example, the IETF draft on Raptor FEC schemes "draft-IETF-RMT-BB-FEC-raptor-object-09" available via the IETF website. The entire Raptor FEC data may then be provided to the RANs via redundancy data transmission 150. The control nodes in the RAN may use all or only some fraction of the Raptor FEC data 151 for provision to the requesting receiving devices. For example, an Node-B may decide to provide a portion of the redundancy data via broadcast to all the receiving devices in the PTM group and to provide further redundancy data to particular receiving devices via one or more PTP connections in case the broadcasted redundancy data is not sufficient for recovering entirely the content data at these devices.

While it is illustrated in the figures that the method 300 may be performed in the BM-SC 102, the method or derivatives thereof may be performed entirely or in part in any other PTM transmission control node in a PTM-enabled network. The method may also be performed distributed over multiple nodes.

Figure 4:
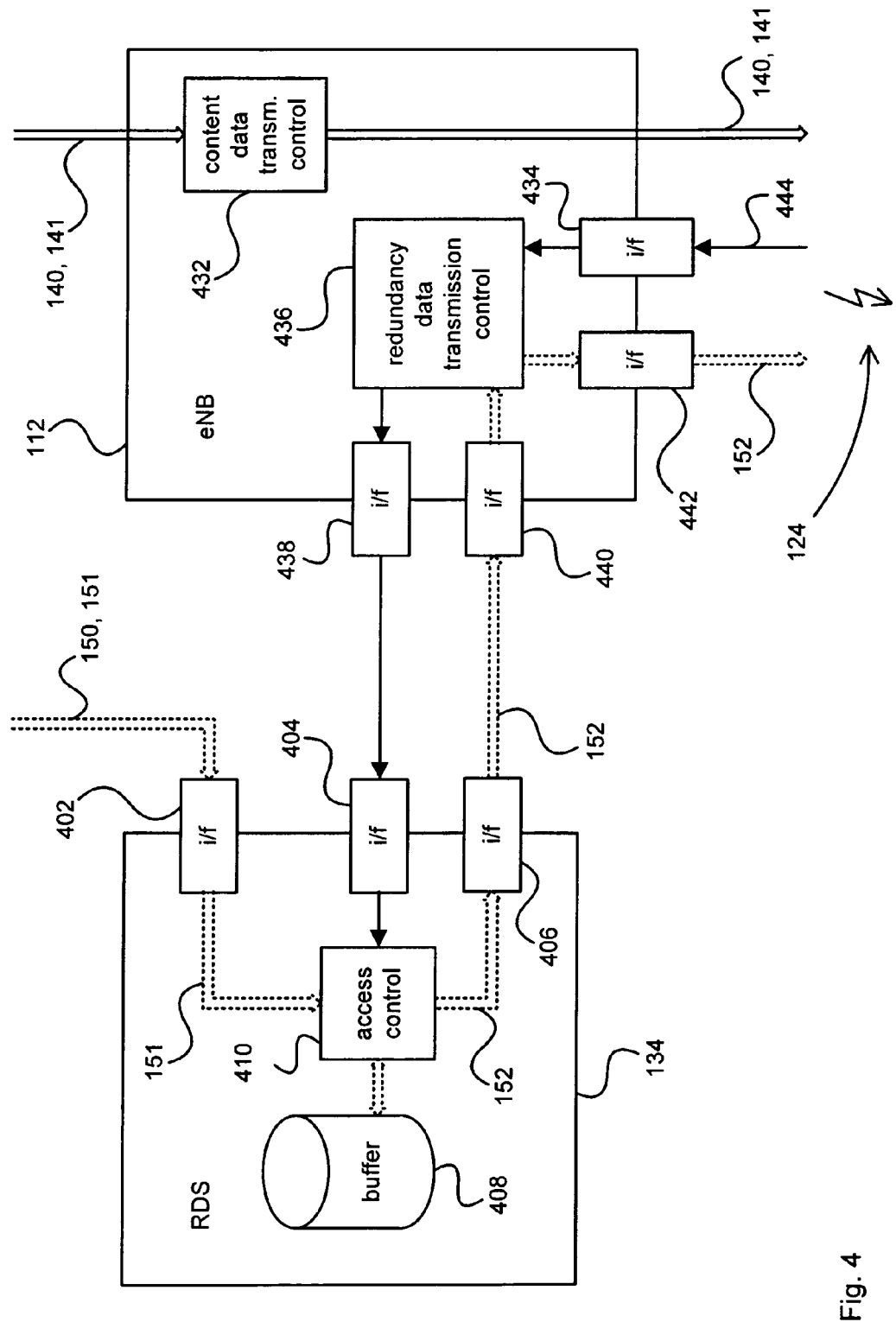
FIG. 4 schematically illustrates functional components of a redundancy data storage and a radio interface control node in the PTM-enabled network of FIG. 1.

FIG. 4 schematically illustrates functional components of the redundancy data storage 134 of FIG. 1 (the RDS 134 is referred to purely for illustrative reasons; the following description could as well be performed referring to the RDS 136 in FIG. 1). The RDS is dedicated to storing redundancy data, i.e. it does not store content data. The RDS 134 comprises a data reception component 402, a request reception component 404, a response component 406, a redundancy data buffer 408 and a buffer access component 410.

Figure 5:
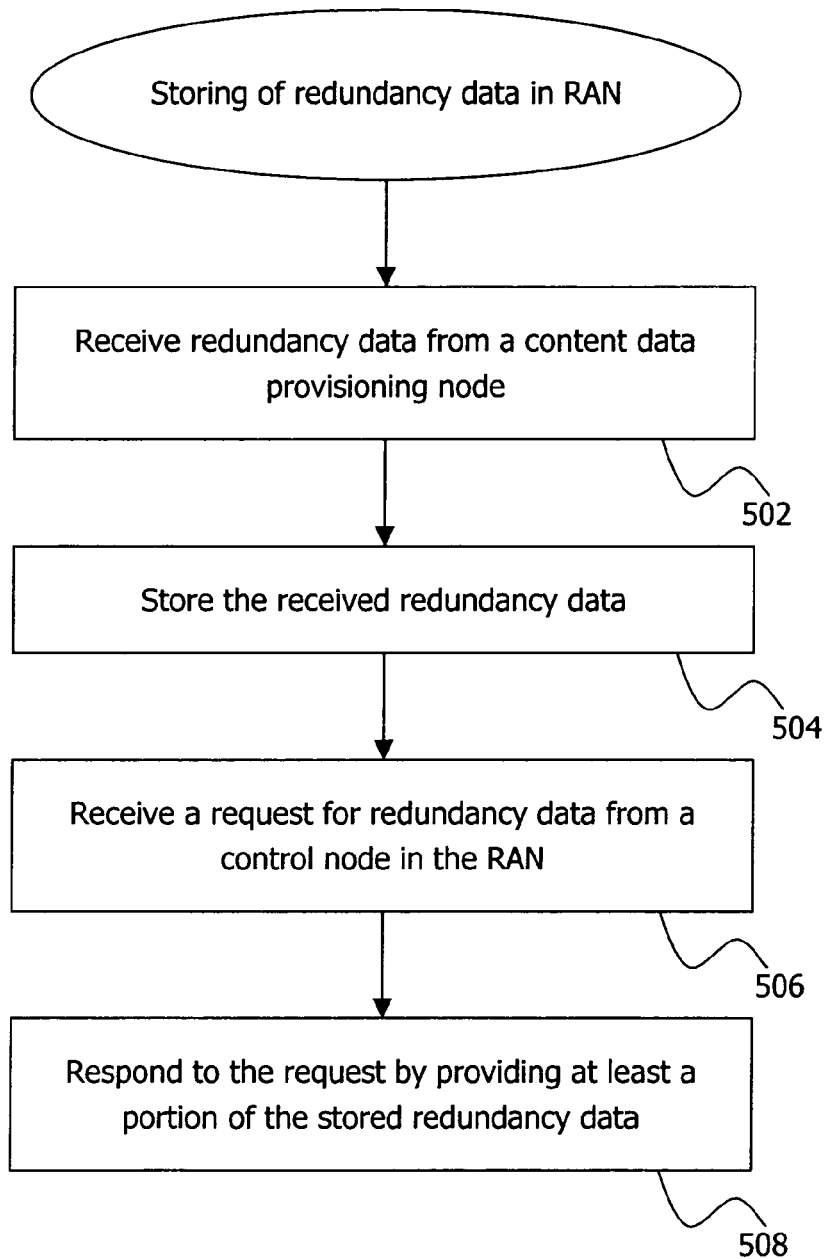
FIG. 5 is a flow diagram exemplarily illustrating an operation of the redundancy data storage of FIG. 4.

FIG. 5 is a flow diagram illustrating an exemplary sequence 500 of operational steps which may be performed by the RDS 134 of FIG. 4. In general, the procedure 500 relates to the storing of redundancy data in a RAN, i.e. near to one or more radio interfaces over which the content data are transmitted to which the redundancy data belong. As illustrated in FIG. 1, the RDS 134 is provided within the RAN 120 as one of the destinations of the redundancy data PTM transmission 150 originating at the BM-SC 102. Referring now to FIGS. 4 and 5, in step 502, the reception component 402 receives the redundancy data 151 transferred via transmission 150 from the content data provisioning node (BM-SC) 102. The redundancy data 151 are provided separately from the content data 141, i.e. while the redundancy data 151 are related to the content data 141 transmitted over the radio interface 124 or 126, the content data 141 are not transmitted to the RDS 134 or stored therein. The node 134 may be used as a redundancy data storage for one or both radio interfaces 124 or 126 or may generally be used for all radio interfaces provided by RAN 120.

In step 504, the received redundancy data 151 is stored in the buffer 408, which may have a suitable size for storing redundancy data as required by the number of radio interfaces with which RDS 134 is associated as well as the number and size of PTM content transmissions performed (essentially in parallel) over these radio interfaces. In step 506, a request for redundancy data is received by the reception component 404. In the illustrated example, the request arrives from the Node-B 112 (e.g., forwarded via RNC 108), as will be described in more detail below.

The reception component 404 triggers the buffer access component 410 according to the received redundancy data request. The access component 410 accesses the buffer 408 and extracts the required redundancy data 152, which may be all or some part of the redundancy data 151 received by transmission 150. The received redundancy data request may comprise an indication whether a portion or the entire redundancy data are required. For example, in case the redundancy data 151 comprises Raptor FEC data, the redundancy data request may indicate the amount of additional symbols as compared to the content data symbols required for error correction.

The access component 410 provides the extracted redundancy data 152 to the response component 406, which in step 508 responds to the prior redundancy data request by providing the extracted redundancy data 152.

The RDS 134 may have received additional control data related to the redundancy data 151. The control data may, for example, comprise an indication of a storage time. The RDS 134 may accordingly start a storage timer (not shown). On expiry of the storage timer, the redundancy data 151 may be deleted in the buffer 408. This allows an effective management of the available memory in buffer 408. The control data may further comprise a duration time indicating the duration of the redundancy data transmission 150, which may also be used to control operation of the RDS 134. As an example, the duration time may be used to manage resource allocation in the various reception and transmission components of the RDS 134, or to manage access to the buffer 408. The access component 410 may not perform any access to the redundancy data 151 in buffer 408 until after the duration time. Further usage of the duration time will be described with reference to FIG. 9 below.

FIG. 4 further illustrates functional components of the Node-B 112 of FIG. 1. The Node-B 112 as described is an exemplary implementation of a redundancy data control node, which is implemented on a radio interface control node for content data PTM transmissions in a PTM-enabled network. The described functionality may also be implemented on an RNC, such as RNC 108 in FIG. 1, or may be implemented in a distributed way on an RNC and Node-B. The Node-B 112 comprises a content data transmission control component 432, a radio interface reception component 434, a redundancy data transmission control component 436, a RAN transmission component 438, a RAN reception component 440 and a radio interface transmission component 442.

Figure 6:
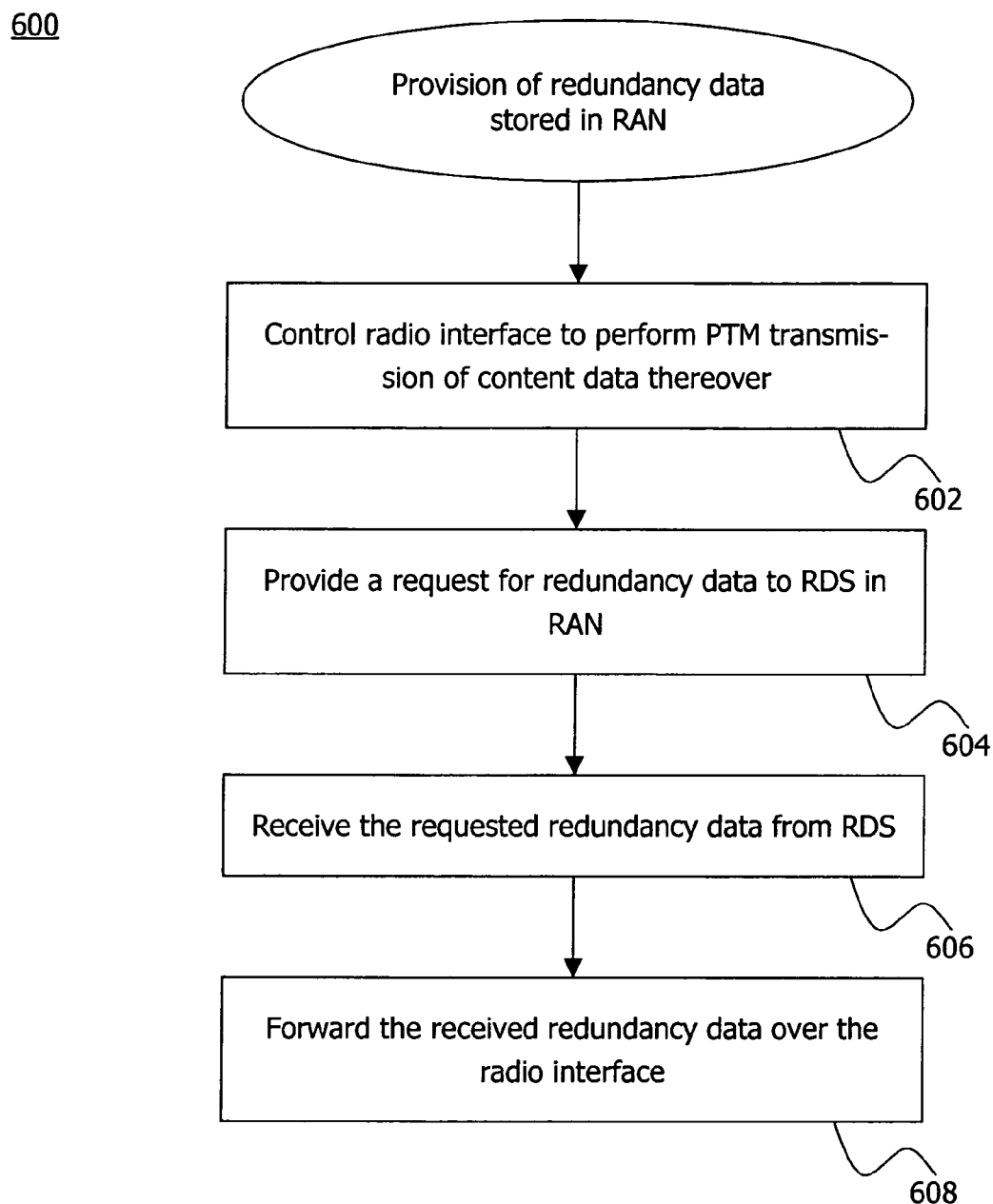
FIG. 6 is a flow diagram exemplarily illustrating an operation of the radio interface control node of FIG. 4.

FIG. 6 is a flow diagram illustrating an exemplary sequence 600 of operational steps which may be performed by the Node-B 112 of FIG. 4. Generally, the Node-B 112 operates to locally provide redundancy data suitable for the correction of transmission errors occurring in the local radio access network. Referring to FIGS. 4 and 6, in step 602 the control component 432 controls radio interface 124 to perform the PTM transmission 140 of the content data 141 thereover.

In step 604, one or more error indications 444 may be received via the radio interface 124 from the receiving devices 130, 132 (see FIG. 1) at the reception component 434. The indications 444 may indicate transmission errors in the content data received via the PTM transmission 140. An error indication 444 may, for example, contain an indication of particular corrupted content data blocks, a request for particular redundancy data, or merely a general indication that redundancy data are requested. The error indications may indicate the Node-B 112 as a destination as opposed to conventional MBMS File Repair Requests, which in the example illustrated here would be directed towards the BM-SC 102.

The reception component 434 provides the received error indication(s) to the control component 436, which performs a decision algorithm based on the received error indication(s). For example, the control component 436 may decide on which RDS to sent a redundancy request to. The control component 436 may also analyse the received error indications 444 and may, for example, summarize multiple error indications 444 in order that a single request 446 is provided to the RDS 134 only. The control component 436 triggers the RAN transmission component 438 according to the result of the decision algorithm. Based on the trigger, in step 606 the RAN transmission component 438 provides a request 446 for redundancy data to the RDS 134.

While in the exemplary scenario described here the RDS 134 is a stand-alone component, in other embodiments a redundancy data storage may be integrated into a radio interface control node such as an Node-B or RNC. The request 444 may then be implemented as an internal signal only.

In step 608, as a response to the redundancy data request 444, the redundancy data 152 are received from the RDS 134 at reception component 440. The reception component 440 provides, controlled by the control component 436, the received data to the radio interface transmission component 442. In step 610, the redundancy data are forwarded over the radio interface 124 as indicated by the dashed line 152. Step 610 may comprise to set up a PTM connection into the cell(s) served by the interface control node. For example, the control component 436 may have decided that a PTM transmission has to be initiated via radio interface 124 because the number of error indications 444 exceeds a predetermined threshold value. Instead of only one PTP transmission, also several PTM transmissions could in principle be initiated for distributing the redundancy data into one or more cells.

While it is illustrated in FIG. 4 that the RDS 134 receives redundancy data requests from the Node-B 112, with reference to the scenario of FIG. 1 the RDS 134 may as well receive redundancy data requests from the Node-B 114 or further radio interface control nodes in the RAN 120.

Figure 7:
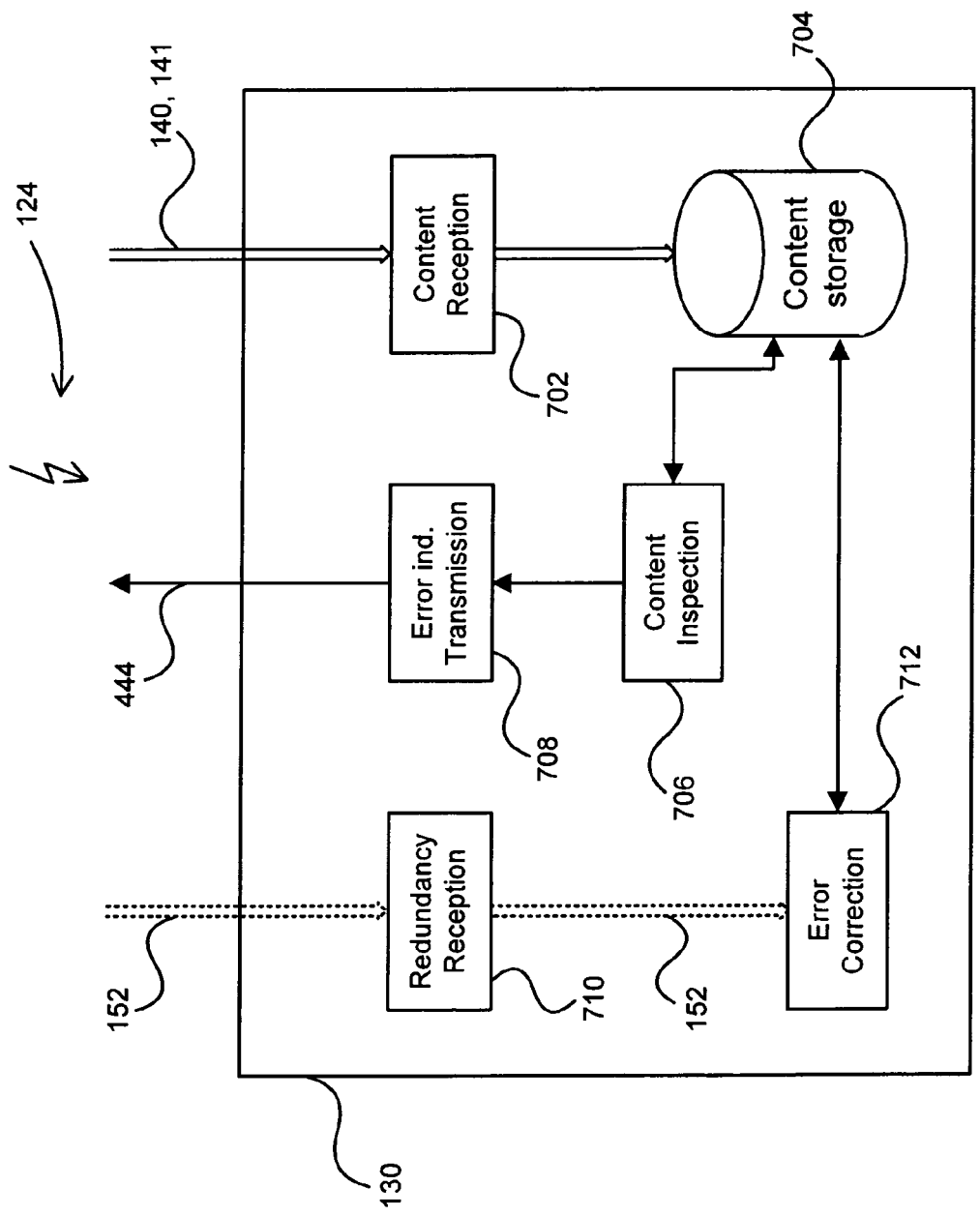
FIG. 7 schematically illustrates functional components of a receiving device in the PTM-enabled network of FIG. 1.

FIG. 7 schematically illustrates functional building blocks of the receiving device 130 of FIG. 1 (the UE 130 is referred to purely for illustrative reasons; any other of the receiving devices 132 in FIG. 1 could as well be used for illustration). The receiving device 130 comprises a content data reception component 702, a content storage 704, an error detection component 706, a transmission component 708, a redundancy data reception component 710 and a correction component 712.

Figure 8:
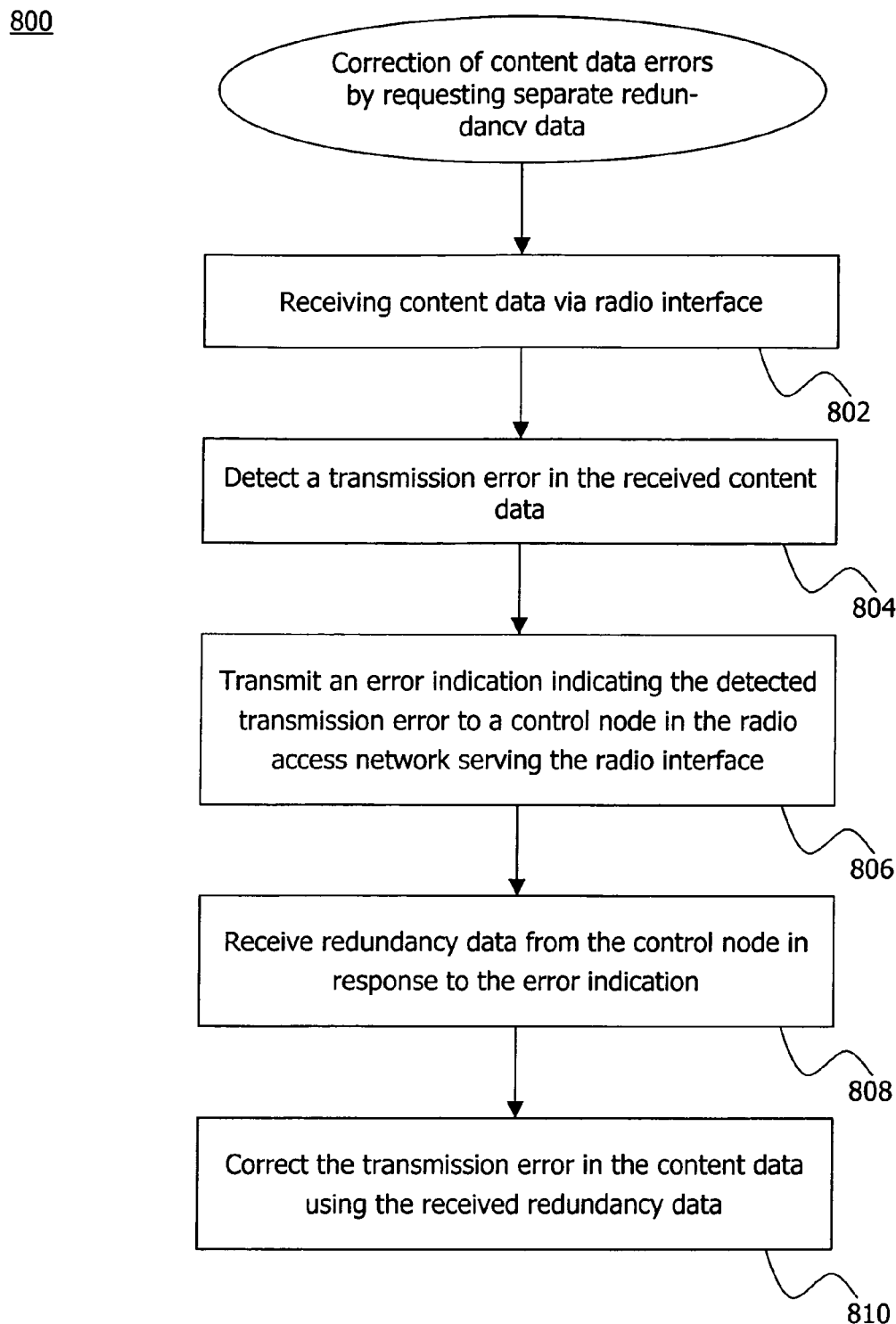
FIG. 8 is a flow diagram exemplarily illustrating an operation of the receiving device of FIG. 7.

FIG. 8 is a flow diagram illustrating an exemplary sequence 800 of operational steps which may be performed by the receiving device 130 of FIG. 7. In general, the procedure 800 relates to the correction of transmission errors in content data by requesting separate redundancy data from the serving RAN, wherein the entire procedure is performed in a radio link layer as opposed to error correction mechanisms of higher layers, e.g. the MBMS File Repair mechanism, which is a network layer or transport layer mechanism. Consequently, components such as error detection component 706 and error correction component 712 are assumed to operate in a radio link layer in the receiving device 130.

Referring now to FIGS. 7 and 8, in step 802, the content data of 141 of content data PTM transmission 140 originating from BM-SC 102 is received by component 702 via radio interface 124 (for example in an MBMS bearer). The part of the PTM transmission 140 illustrated in FIG. 7 may in particular comprise a radio link (no extra reference numeral in FIG. 7 for the sake of clarity) extending over the radio interface 124 and connecting the receiving device 130 and the Node-B 112 (cf. FIG. 4) in the radio access network 120. Over the radio link, the content data is transmitted from Node-B 112 to receiving device 130. Symbols representing multiple bits of the content data may be transported in the form of data packets or frames over the radio link, wherein a symbol may be transported in one or more packets. The reception component 702 stores the received content data 141, i.e. the sequence of received packets, in content storage 704.

The error detection component 706 is operable in the radio link layer (UMTS RLC layer) and adapted to inspect the content data stored in storage 704 and to detect transmission errors in the stored data in step 804. The error detection component 706 may detect corrupted data blocks in one or more of different ways. For example, in case the data are stored in the form of packets as received via the radio link, the component may determine whether packets are missing. In case it is not possible to successfully reconstruct the data, because one or more packets are missing, the component 706 may conclude that a transmission error has been detected. In case some (minimum) amount of redundancy data is included within the content data 141, the component 706 may use this redundancy data to detect the transmission error. The inspection of the received content data may be performed during the reception of the content data 141 or afterwards.

In case a transmission error has been detected, the error detection component 706 triggers the transmission component 708. Accordingly, in step 806 the transmission component 708 transmits the error indication 444 illustrated already in FIG. 4 via radio interface 124 to RAN 120 (cf. FIG. 1). In particular, the error indication may be sent via the radio link (part of PTM transmission 140) used to transmit the content data 141 to the receiving device 130. Taking the above example further, in case the error detection component 706 has detected missing packets the trigger may indicate the missing packets. The error indication 444 sent towards the serving Node-B 112 in the RAN 120 may also indicate the missing packets.

The reception component 710 is adapted to receive in step 808 the redundancy data 152, which is transmitted via the radio link described above over the radio interface 124 from the serving Node-B 112 in response to the error indication 444 (see FIGS. 1, 4). The redundancy data 152 may be received via an application layer PTP connection or via a PTM (broadcast or multicast) transmission. The reception component 710 provides the received redundancy data 152 to the error correction component 712, which is operable in the radio link layer in step 810 to correct the detected transmission error(s) in the content stored in storage 704 based on the received redundancy data 152. For example, the redundancy data may be FEC data comprising the missing packets.

In case the received redundancy data are not sufficient to correct the detected transmission errors, the receiving device 130 may connect to the BM-SC 102 via a PTP connection (not shown) in order to request a re-transmission of the content file according to the MBMS File Repair procedure described in the 3GPP TS 26.346. This procedure is referenced as an application layer mechanism herein, which is performed above a network (IP) layer, e.g. in the HTTP layer, as opposed to the radio link layer mechanism described above with reference to FIG. 7, which is performed below the network layer. Alternatively, the receiving device 130 may request further redundancy data from the BM-SC 102.

Figure 9:
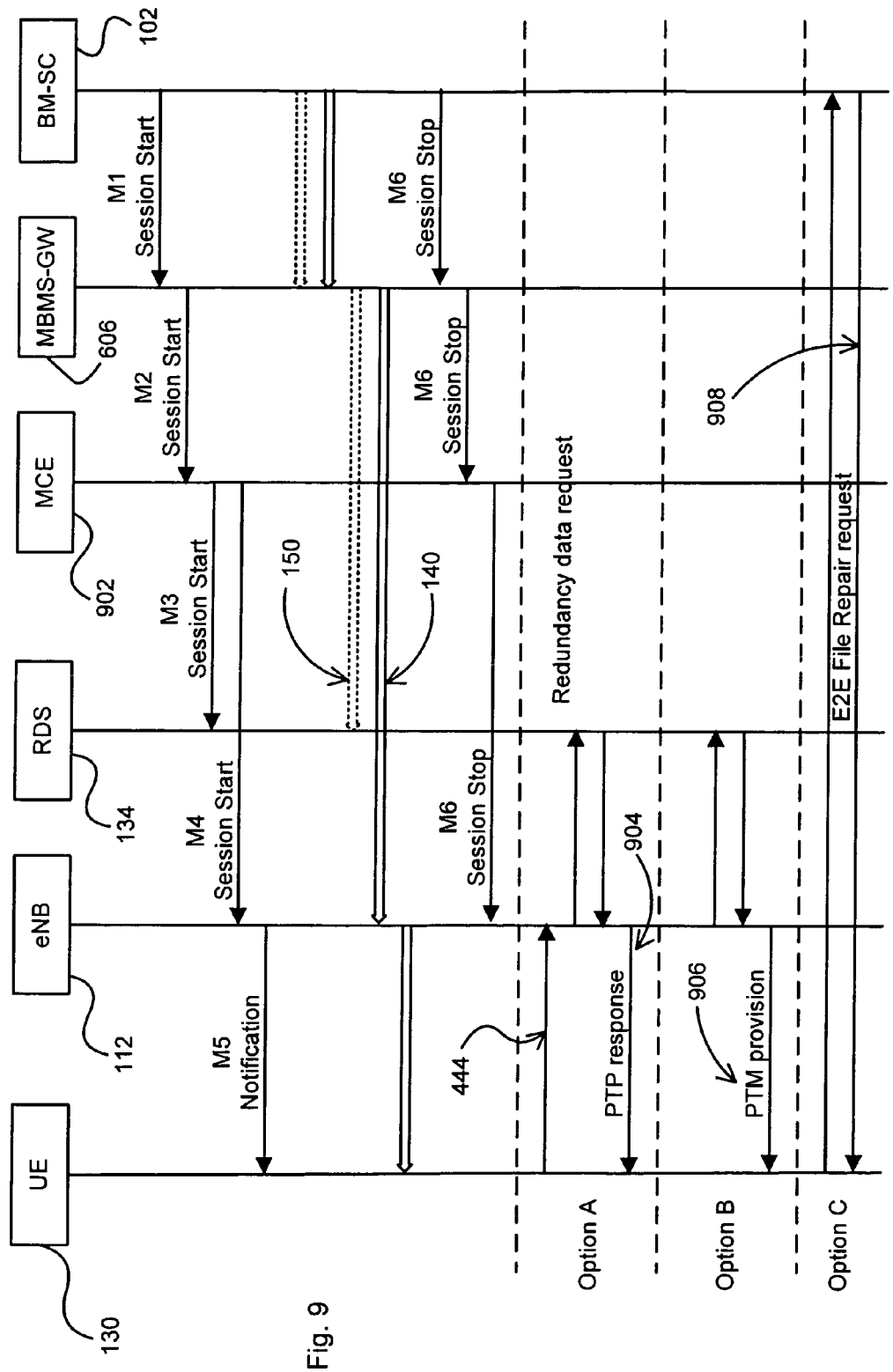
FIG. 9 is a message sequence diagram exemplarily illustrating a message flow in the PTM-enabled network of FIG. 1.

FIG. 9 is a sequence diagram illustrating an exemplary message exchange 900 related to the PTM content data transmission 140 in network 100 of FIG. 1. The message flow 900 may involve one or more SGSNs in the core network, which are however not shown in FIG. 9.

In order to prepare the PTM transmission 140 of content data 141, the BM-SC 102 provides a Session Start message M1 with an indication of the upcoming MBMS content data transmission 140 to the MBMS-GW 104. M1 may also contain an indication that the redundancy data will be transmitted as a separate flow, i.e. via a separate PTM transmission 150. The MBMS-GW 104 forwards the received Session Start message M1 as Session Start message M2, which includes a TMGI (Temporary Mobile Group Identity), as well as IP multicast addresses for the MBMS content data flow 140 and for the FEC data flow 150. The session start message M2 is sent to one or more relevant RNCs.

The RNC 108 forwards the received Session Start message M2 as Session Start message M3 including an address for the FEC data flow 150 to the corresponding RDS 134. The RDS 134 joins in response to the reception of M3 the transport level multicast group indicated therein. The BM-SC 102 may have included in the Session Start message M1 timer values for a storage time of the FEC data 151 and/or a duration time value for the redundancy data transmission 150. The RDS 134 may set a storage timer for the stored data 151 accordingly and may store the duration time value in order to determine the time when the content data transmission 140 will be finished.

The RNC 108 provides a further Session Start message M4 to Node-Bs involved in the content data transmission 140, for example the Node-B 112. The Session Start message M4 comprises the address for the MBMS content data flow 140. In response to receiving message M4, the Node-B 112 joins the transport level multicast group for the content transmission 140. The Node-B 112 provides via the served radio interfaces notifications M5 to the receiving devices 130 (and 132) involved in the MBMS group for the PTM content transmission 140.

Subsequent to the Sessions Start message distribution M1-M5, the PTM transmissions 140 and 150 are performed. In the example illustrated in FIG. 9, both data transmissions are performed in parallel. However, the redundancy data transmission 150 may finish earlier or may take longer than the content data transmission 140. Only after both transmissions 140 and 150 have been finished, Session Stop messages M6 are propagated from BM-SC 102 down the hierarchy of the content data transmission 140. Extra Session Stop messages may also be provided for the redundancy data transmission 150. However, in case duration time values for transmission 150 are provided to the redundancy data storages, an explicit Session Stop message may be omitted, as shown in FIG. 9. Many components (except the RDSs) may be involved in both the redundancy data transmission 150 and the content data transmission 140, and may thus determine from the Session Stop messages M6 that both data flows are finished and thus resources may be unallocated for both flows. The Node-B 112 has not any resources allocated for the redundancy data transmission 150.

After Session Stop, redundancy data are available at the redundancy data storages in the radio access network, i.e. near to the radio interface served by the Node-Bs. Concretely, the RDS 134 holds the redundancy data for the radio interface (s) served by Node-B 112. The content receiving device 130 now has several options to correct detected transmission errors in the received content data 141. The options are illustrated as options A, B and C in FIG. 9. According to option A the receiving device 130 contacts the Node-B 112 by sending the error indication 444 as has been illustrated in detail in FIGS. 4 and 7. The Node-B 112 may then request relevant redundancy data from the RDS 134 as illustrated in FIG. 4. According to option A the Node-B 112 provides the redundancy data received from the RDS 134 in form of a PTP connection 904 to the receiving device 130.

According to option B, the Node-B 112 decides to provide redundancy data via a PTM transmission 906 to all receiving devices in a cell or SFN (Single Frequency Network). The Node-B 112 may decide to do so, for example, in case the number of received error indications 444 exceeds a predefined threshold. A decision for PTM transmission 906 may also originate from the BM-SC 102 or RNC 108 (not shown). As option C, the receiving device 130 may use a PTP connection to the BM-SC 102 to request file repair according to the 3GPP MBMS File Repair procedure.

In response to the detection of a transmission error, in some embodiments the receiving device 130 may be configured to apply option A in a first step in order to locally request and receive redundancy data from the serving RAN. Only in case the provided redundancy data is not sufficient for error correction, the receiving device may request file re-transmission (or further redundancy data) from the originator of the content transmission, the BM-SC (option C). As a modification of option C, the BM-SC 102 may decide to trigger, in response to too many File Repair requests, one or more radio interface control nodes such as Node-B 112 to provide redundancy data stored locally in the corresponding RANs via a PTM transmission (option B) to the requesting devices. In this case, the File Repair Response 908 to all or some of the requesting devices may be omitted.

In MBMSFN (MBMS Single Frequency Networks) environments the RNC may decide on the amount of transmitted redundancy data for the entire MBSFN area. The redundancy data may then be stored close to those Node-Bs/RNCs which handle the interactive traffic for the MBSFN.

It has been illustrated in the figures that the redundancy data may be transported using a PTM transmission group in the transport network separate from that used for the content data transmission. As an alternative, the redundancy data and the content data may be transported within the same PTM transmission group, e.g. IP multicast group. In this case, however, the content data flow and the redundancy data flow have to be separated by other means. For example the GTP (GPRS tunneling protocol) may be used for this purpose. This would mean that a radio interface control node (e.g, RNC or Node-B) which has a redundancy data storage associated therewith, has to separate the redundancy data from the content data based on the different tunnel end point identifiers. The RNC/Node-B then has to separately forward the redundancy data to the redundancy data storage and the content data over the radio interface. In other embodiments the data packets carrying redundancy data may be marked in a different way to allow that a radio interface control node may specifically filter the redundancy data packets to separate them from the content data flow. A separation within a common PTM data distribution group may in principle also be achieved in time; e.g., the redundancy data may be transmitted first and the content data afterwards.

In some embodiments, some RANs involved in a PTM content data distribution may locally store redundancy data, while other RANs do not. For example, in case redundancy data is centrally provided by a content transmission control node such as a BM-SC, a PTM transmission group for distributing the redundancy data may be configured to anticipate an occurrence pattern of transmission errors, i.e. preferentially those radio interfaces (cells) which presumably will be particularly error-prone may be provided with locally stored redundancy data. No redundancy data may be provided to RANs known for generally better transmission conditions. Receiving devices connected via these RANs may still request a re-transmission of a corrupted file via, e.g., a file repair service such as the 3GPP MBMS File Repair procedure.

In case the redundancy data are centrally determined, instead of a single PTM transmission of redundancy data, two or more redundancy data PTM transmissions may be performed. For example, different sets of redundancy data may be prepared in the BM-SC and may be distributed to the RANs, e.g. according to anticipated transmission conditions. As another alternative, additionally or alternatively to one or more PTM transmissions to the redundancy data storages in the RANs, one or more PTP connections may be established between the central node and the RDSs for distributing the redundancy data.

Instead of a central determination, the redundancy data may also be determined by a local node in the RAN, i.e. by a node located near to the respective radio interface. For example, each redundancy data calculating node may locally (and possibly autonomously) decide on the amount of redundancy data which presumably will be required for a PTM content data transmission over the radio interface.

The proposed techniques provide the basis for improved error control for content data PTM transmissions in wireless networks. Content data is offered to the receiving devices in a reliable way while making efficient use of the available transmission resources. Part or all of the redundancy data required for a correction of transmission errors in content data is provided near to the radio interface on the network side. No or a minimum amount of redundancy data needs to be transmitted within the content data. This increases efficiency of transmission resource usage, e.g. in cases in which the redundancy data is required for only few of the receiving devices due to transmission conditions which are generally sufficient for error-free reception.

A receiving device requiring nevertheless some error correction may contact its local radio interface control node serving the radio interface via which the receiving device is connected to the network, instead of contacting the distant originator of the content data transmission. The redundancy data may then be locally provided to the requesting devices only. This generally saves transmission resources within the network, e.g. for PTP connections extending over the entire network or a PTM re-transmission of the content data.

Providing the redundancy data locally in the RANs also allows local adaptation of the type and/or amount of redundancy data. In case of, e.g., Raptor FEC data, an originator of the content transmission may provide a large amount of redundancy data for storage in the redundancy data storages near to the radio interfaces. The radio interface control node may then selectively provide portions of these data as needed locally. Thus, only those redundancy data are transmitted over the radio interface, which are actually needed, thereby saving transmission resources.

In other scenarios, redundancy data which will presumably be required due to local transmission conditions is locally calculated by nodes in the RANs. While this involves parallel processing resources in multiple radio interface control nodes within the distribution area of a PTM content transmission, it saves transmission resources within the network and is another possibility to adapt the redundancy data to local conditions.

In still different scenarios, a part of the redundancy data is provided by the originator of the content transmission and an additional part is calculated by a control node in the RAN. Both, the centrally delivered redundancy data and the locally determined redundancy data may be stored in the local redundancy data storage. In this way, an optimum combination of usage of processing resources in the RAN and data transmission resources in the network may be established.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for controlling a point-to-multipoint (PTM) transmission of content data in a PTM-enabled mobile network, comprising the following steps:
   receiving redundancy data at a dedicated redundancy data storage in a radio access network of the PTM-enabled mobile network over which the PTM transmission of the content data is performed, wherein the redundancy data are provided for a correction of transmission errors in the content data resulting from the transmission of the content data without the redundancy data over one or more radio interfaces defining cells of the radio access network;
   storing the received redundancy data in the redundancy data storage;
   receiving a request for redundancy data from a redundancy data control node; and responding to the redundancy data request by providing at least a portion of the redundancy data;
wherein the step of receiving the redundancy data includes receiving at least one of:
a storage time value indicating a time span for storing the redundancy data in the redundancy data storage, and
a duration time value indicating duration of the reception of the redundancy data.

2. The method according to claim 1, wherein the redundancy data are received via a PTM transmission separate from the PTM transmission of the content data.

3. The method according to claim 1, wherein the step of responding to the redundancy data request is performed only after a termination of the PTM transmission of the content data.

4. A method for controlling a point-to-multipoint (PTM) transmission of content data in a PTM-enabled mobile network comprising the following steps in a PTM transmission control node of the PTM-enabled mobile network:
determining redundancy data from the content data, wherein the redundancy data are provided for a correction of transmission errors in the content data resulting from the transmission of the content data without the redundancy data over a radio interface defining a cell of a radio access network of the PTM-enabled mobile network;
transmitting the content data in an application layer extending over the radio interface to one or more receiving devices; and
transmitting the determined redundancy data to a redundancy data storage associated with the radio interface;
wherein the step of transmitting the determined redundancy data includes transmitting at least one of:
a storage time value indicating a time span for storing the redundancy data in the redundancy data storage, and
a duration time value indicating a duration of the reception of the redundancy data.

5. The method according to claim 4, wherein the redundancy data are transmitted simultaneously with the content data.

6. The method according to claim 4, wherein the redundancy data are transmitted with a PTM transmission separate from the PTM transmission for the content data.

7. A redundancy data storage in a radio access network of a mobile network enabled for a point-to-multipoint (PTM) transmission of content data, the redundancy data storage being dedicated to storing redundancy data and comprising:
a first component configured to receive redundancy data provided for a correction of transmission errors in the content data resulting from the transmission of the content data without the redundancy data over one or more radio interfaces defining cells of the radio access network;
a second component configured to store the received redundancy data in the redundancy data storage;
a third component configured to receive a redundancy data request from a redundancy data control node; and
a fourth component configured to respond to the redundancy data request by providing at least a portion of the redundancy data;
wherein when receiving the redundancy data, the first component is configured to receive at least one of:
a storage time value indicating a time span for storing the redundancy data in the redundancy data storage, and
a duration time value indicating a duration of the reception of the redundancy data.

8. A point-to-multipoint (PTM) transmission control node in a mobile network enabled for a PTM transmission of content data, comprising:
a first component configured to determine redundancy data from the content data, wherein the redundancy data are provided for a correction of transmission errors in the content data resulting from the transmission of the content data without the redundancy data over a radio interface defining a cell of a radio access network of the PTM-enabled mobile network;
a second component configured to transmit the content data in an application layer extending over the radio interface to one or more receiving devices; and
a third component configured to transmit the determined redundancy data to a redundancy data storage associated with the radio interface;
wherein when transmitting the redundancy data, the third component is configured to transmit at least one of:
a storage time value indicating a time span for storing the redundancy data in the redundancy data storage, and
a duration time value indicating a duration of the reception of the redundancy data.

* * * * *

UNITED STATES PATENT AND TRADEMARK OFFICE
CERTIFICATE OF CORRECTION

PATENT NO. : 8,386,900 B2  
APPLICATION NO. : 12/867292  
DATED : February 26, 2013  
INVENTOR(S) : Lohmar et al.

Page 1 of 1

It is certified that error appears in the above-identified patent and that said Letters Patent is hereby corrected as shown below:

On the Title Page, in Item (56), under "OTHER PUBLICATIONS", in Column 2, Line 1, delete "al: "Rellable" and insert -- al., "Reliable --, therefor.

Signed and Sealed this  
Fourteenth Day of June, 2016

Michelle K. Lee  
*Director of the United States Patent and Trademark Office*